United States Patent [19]

Schönell

[11] Patent Number: 5,076,759

[45] Date of Patent: Dec. 31, 1991

[54] WINDMILL

[76] Inventor: Jürgen Schönell, Meisenweg 1,, 4178 Kevelaer 3, Fed. Rep. of Germany

[21] Appl. No.: 656,014

[22] Filed: Feb. 14, 1991

Related U.S. Application Data

[63] Continuation of Ser. No. 462,906, Jan. 8, 1990, abandoned, which is a continuation of Ser. No. 166,989, Mar. 11, 1988, abandoned.

[51] Int. Cl.⁵ ............................................. F03B 3/14
[52] U.S. Cl. ............................. 416/119; 416/197 A; 415/4.2
[58] Field of Search ............. 416/197 A, DIG. 9, 85, 416/119; 415/4.1, 4.2

[56] References Cited

U.S. PATENT DOCUMENTS

| 232,205 | 9/1880 | Preston | 416/119 |
|---|---|---|---|
| 434,108 | 8/1890 | Gatlin | 416/119 |
| 1,015,517 | 1/1912 | Snyder | 416/119 |
| 1,017,409 | 2/1912 | Granger | 416/119 |
| 1,037,260 | 9/1912 | Johnston | 416/119 |
| 1,315,587 | 9/1919 | Wyborney | 416/119 |
| 1,645,996 | 10/1927 | McQuiston | 416/119 |
| 3,093,194 | 6/1963 | Rusconi | 416/119 |
| 3,359,479 | 12/1967 | Crompton | 416/DIG. 4 |
| 4,162,410 | 7/1979 | Amick | 416/DIG. 4 |
| 4,291,235 | 9/1981 | Bergey et al. | 416/DIG. 4 |

FOREIGN PATENT DOCUMENTS

| 478537 | 6/1929 | Fed. Rep. of Germany | 416/119 |
|---|---|---|---|
| 502616 | 5/1920 | France | 416/197 A |
| 499951 | 1/1921 | France | 416/119 |
| 721221 | 3/1932 | France | 416/119 |
| 771804 | 10/1934 | France | 416/119 |
| 1133415 | 3/1957 | France | 416/197 A |
| 2392249 | 12/1978 | France | 416/197 A |
| 2461119 | 3/1981 | France | 416/119 |
| 2469576 | 5/1981 | France | 416/119 |
| 2494781 | 5/1982 | France | 416/119 |
| 126084 | 7/1984 | Japan | 416/119 |
| 598489 | 4/1978 | Switzerland | 416/197 A |
| 248447 | 3/1926 | United Kingdom | 416/119 |

Primary Examiner—Edward K. Look
Assistant Examiner—Hoang Nguyen
Attorney, Agent, or Firm—Watson, Cole, Grindle & Watson

[57] ABSTRACT

A drum-shaped windmill with a cylinder tube 1 mounted coaxially to the rotation axis of the windmill with one of each of the circular end plates 2,3 on both ends of the cylinder tube 1 is described, featuring sails 6,7,8,9 with a curved streamlined profile which swivel to a limited degree near the edge of both end plates 2,3 on floating axes 10,11,12,13 mounted parallel to the rotation axis of the windmill. The arrangement has been effected in such a way that at least four sails 6,7,8,9 having a curved streamlined profile are distributed on the circumference of the windmill at equal circumferential distances and that the sails 6,7,8,9 are swivelable with their noses 18,21 in front on the floating axes 10,11,12,13 in the area between the edge 4,5 of the end plates 2,3 and the cylinder tube 1.

5 Claims, 2 Drawing Sheets

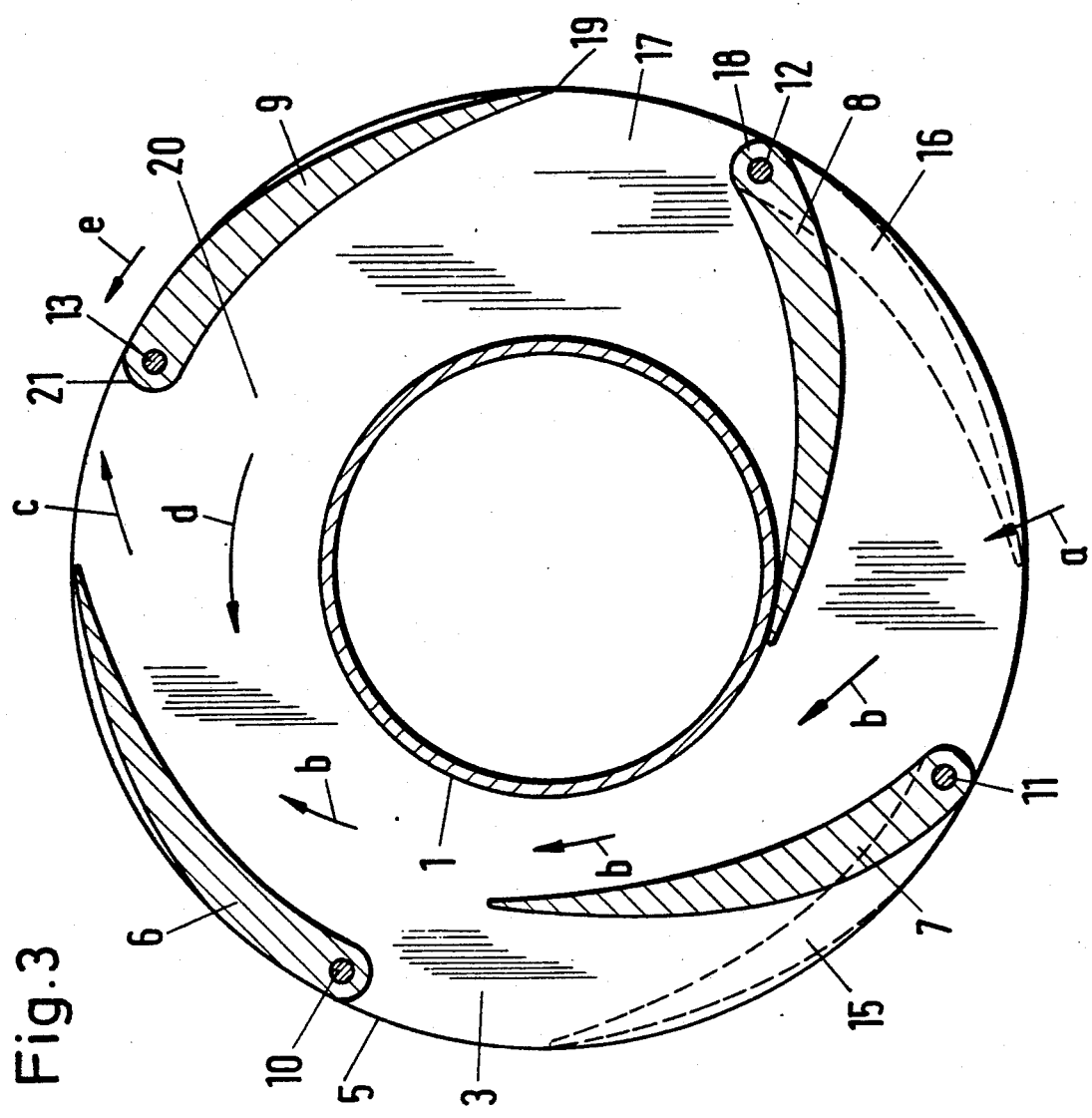

WINDMILL

This application is a continuation of Ser. No. 462,906 filed January 8, 1990, now abandoned, which is a continuation of Ser. No. 166,989 filed March 11, 1988, now abandoned.

The invention concerns a drum-shaped windmill with a cylinder tube mounted coaxially to the rotation axis of the windmill with a circular end plate on both ends of the cylinder tube, featuring sails with a curved streamlined profile, which swivel to a limited degree near the edge of both end plates on floating axes mounted parallel to the rotation axis of the windmill.

We are already familiar with a wind power engine from DE-OS 27 18 608, which has a cylinder, two end plates on both ends of the cylinder and several cylinder-segment-shaped surfaces. These segments surfaces or sails are embedded on floating axes which are mounted parallel to the rotation axis of the wind power engine. At the same time, each of the segment surfaces is movable about a floating axis parallel to the rotation axis of the wind power engine which lies asymmetrically to the surface centre. It is movable in that the wider part of the segment surface may swivel outwards about a variable angle of up to 90°. In the swivelled state, the larger part of the surface width protrudes from the contour of the wind power engine, while the narrower part projects inwards. When a horizontal wind current hits the wind power engine in a vertical position, the segment surface swivels whose floating axis lies behind—seen in the direction of the wind—out of the cylinder contour of the wind power engine against the wind. The dynamic pressure acting on this surface turns the whole cylinder system and the next segment surface runs into the current and swivels out. The current grazes the segment surfaces on the side of the system opposite the swivel position in such a way that the floating axis lies in front.

This well-known power engine rotates in the direction of the tails of the segment surfaces. This results in the fact that these segment surfaces act like scoops, and therefore the entire wind power engine acts like a bucket wheel. Furthermore, this results in the fact that the highest rotational velocity of this well-known wind power engine corresponds to the wind velocity. The rotational velocity and, in turn, the level of efficiency are to a great extent dependent on the prevailing wind velocity.

In the case of the vertical axial rotor with which we are familiar from DE-GM 82 28 078 with two plates extending crosswise to the rotor axis and rotor sails mounted axis-parallel between the plates, the rotor sails may rotate freely about a floating axis parallel to the rotor axis. Furthermore, a stopper is provided for each of the rotor sails by means of which the respective rotor sail is held in appropriate radial alignment upon establishing contact with the stopper allocated. This has the effect that only the driving rotor sails in the respective rotating stage of the vertical axial rotor are fixed against the pressure of a driving current, while those rotor sails not taking part in the driving process and opened only by air resistance, fall pendulously into a swinging position of lowest current resistance.

It is also true in this case that this vertical axial rotor can achieve a maximum rotational velocity corresponding to the prevailing wind velocity.

SUMMARY OF THE INVENTION

The basic purpose of the invention is to improve a windmill of the type mentioned in the introduction in such a way that it lies particularly favourably in the wind, has a particularly high degree of efficiency and is for the most part independent of prevailing wind velocities.

This problem is solved by the invention in that at least four sails with a curved streamlined profile are distributed at equal circumferential distance on the circumference of the windmill and that the sails swivel with their noses in front on the floating axes in the area between the edge of the end plates and the cylinder tube.

In this way we achieve a drum-shaped windmill of the type mentioned above, which rotates in the direction of the noses of the sails. This means at the same time that the sails may only move within the area between the edge of the end plates and the cylinder tube, however they may not move outwards out of the cylindrical contour of the windmill. For this reason the rotational velocity of the windmill may be higher than the wind velocity. In this way the windmill lies particularly favourably in the wind and has a particularly high degree of efficiency.

Developing the invention further, the inner distance between the nose of a sail and the tail of the neighbouring sail may be approximately equal with the inner distance between the nose of the sail and the cylinder tube. This ensures that the wind blowing against the windmill from the side may easily enter the windmill and flow through same.

In this way a force of pressure is exerted on the windmill at the point where the wind is admitted and at the same time a suction force is exerted on the windmill at the point where the wind leaves the windmill located opposite in the direction of rotation of the windmill.

A uniform distribution of hollows may be made on the outer surfaces of the sails to render it more effective. The hollows or depressions may be distributed on the upper surface of the sail in a certain regular or irregular pattern. This results in the wind getting caught in these uneven or rough surfaces created by the hollows or depressions on the sail and whirls are formed. Therefore, the wind does not slide off the surface of the sail. This ensures that the windmill starts up particularly smoothly.

A profile strip may be fixed to each of the floating axes. This creates a space between the profile strip and the swivelled-in sail in which dynamic pressure is created by the oncoming wind. The slats are smooth so that the wind may slide off as easily as possible.

A further advantageous characteristic of the invention is that the arrangement may be effected in such a way that the sail and the profile strip interlock in the swivelling axis area like a hinge joint. This ensures that the profile strip is stable on the axis on which the sail may swing back and forth.

Furthermore, stoppers may be provided at the edges of both end plates in the area of the tails of the sails. This ensures that the sails do not swivel outwards beyond the cylindrical contour of the windmill.

Advisably the cylinder tube is rotatable on one of the rotating axes mounted in the axis of the cylinder tube.

The arrangement may be effected in such a way that a generator is embedded within the cylinder tube in such a way that the stator of the generator is attached to the cylinder tube and the rotor is attached to stationary rotation axis.

It is also possible to attach a pump within the cylinder tube.

The windmill described above may be used in the horizontal and vertical positions.

The invention will be explained in more detail in the following by means of two detailed examples represented in the drawing.

BRIEF DESCRIPTION OF THE DRAWINGS

FIG. 3 shows an enlarged cross section through the windmill in accordance with FIG. 1, FIG. 4 shows a detail according to a second embodiment of the invention, and FIG. 5 is a detail similar to FIG. 4 with the sail swivelled away.

DETAILED DESCRIPTION OF THE PREFERRED EMBODIMENTS

Figure 1:
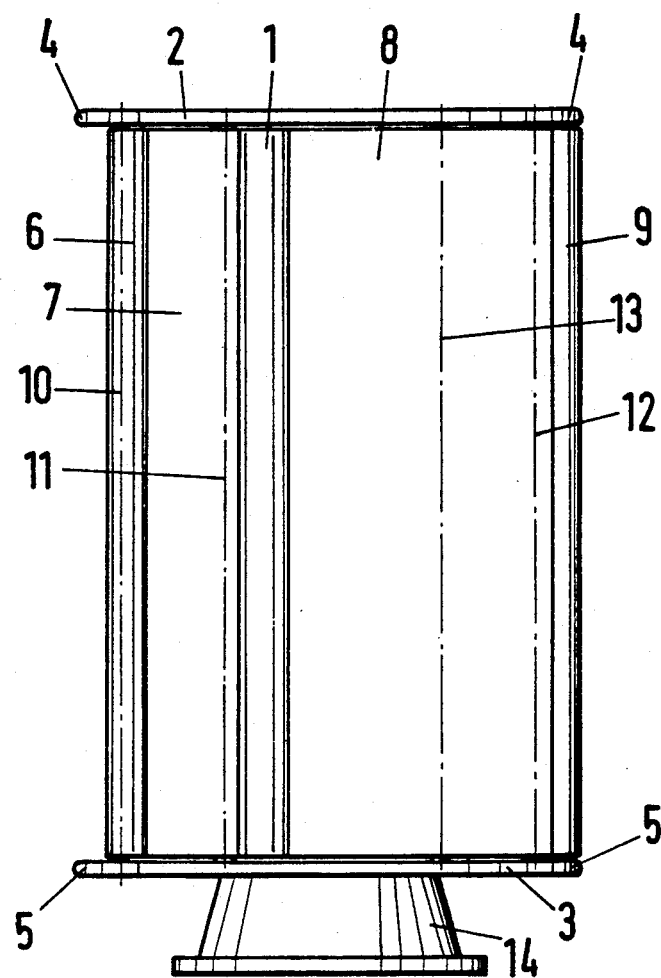
FIG. 1 shows a side view of a windmill designed according to the invention.
Figure 2:
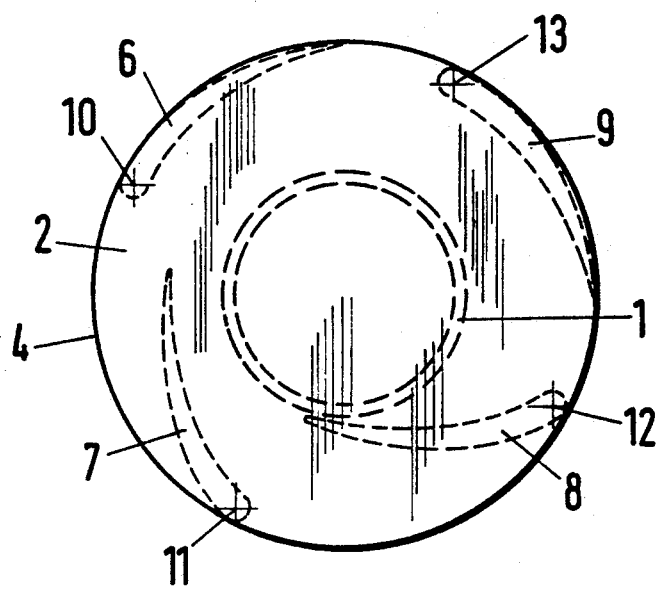
FIG. 2 shows a top view of FIG. 1.

The drum-shaped windmill represented in the drawing includes a cylinder tube 1, and an upper end plate 2, and a lower end plate 3, free end plates being mounted on opposite ends of the cylinder tube 1. Sails 6,7,8,9, which swivel on floating axes 10,11,12,13, are attached near the edges 4 and 5 of the end plates 2 and 3.

The windmill rotates on a base 14.

The sails 6,7,8,9 swivel in an area between the outer edge 4,5 and the cylinder tube 1 on the floating axes 10,11,12,13. As may be seen in FIG. 3 in particular the sails 6,9 take up the outermost position possible, while sail 8 is swivelled into the innermost position and sail 7 takes up a middle position between the edge 4,5 of the end plates 2,3 and the cylinder tube 1. The outermost position possible, which may be reached by sails 7 and 8, are represented by the broken lines in FIG. 3 and are given reference numbers 15 and 16.

The inner distance 17 between the nose or head end 18 of sail 8 and the tail end 19 of the neighbouring sail 9 is approximately equal to the inner distance 20 between the nose 21 of sail 9 and the cylinder tube 1.

According to a second embodiment of the invention represented by FIGS. 4 and 5, a profile strip 23 is fixed to a floating axis 22 comparable to the floating axis 13 in FIG. 3. The profile strip 23 may not be rotated and thus maintains its position represented in FIGS. 4 and 5 for every position of the windmill. In addition, a sail 24 comparable to sail 9 in FIG. 3 is attached to the floating axis 22, which swivels on the swivelling axis 22 in the area between the outer edge of the end plates 2,3 and the cylinder tube 1.

The sail 24 and the profile strip 23 interlock in the area of the swivelling axis 22 like a hinge joint.

When the sail 24 swivels inwards, as is represented in FIG. 5, a triangular space 25 is formed between the slat 23 and the sail 24.

In order that the outer surface of the profile strip 23 passes over to the outer surface of the sail 24 without forming an edge, a recess 26 is formed in the sail 24, which extends along its entire length, in which the profile strip 23 is embedded when the profile strip 23 and the sail 24 are in the position represented in FIG. 4.

The end plates 2,3 have stoppers (these are not indicated in the drawings), which prevent the sails 6,7,8,9 from swivelling too far outwards beyond the cylindrical contour of the windmill.

In addition, a generator (which has not been illustrated) may be embedded in the cylinder tube 1 in such a way that the stator of the generator is attached to the cylinder tube and the rotor is attached to the stationary rotation axis.

When the wind enters the windmill in the direction of the arrow a, it flows through the windmill in the direction of the arrow b and leaves it in the direction of the arrow c. In this way, the sail 8 is swivelled against the cylinder tube 1, and a force acting in the direction of rotation d is exerted on the sail 8. In this operational position the sail 7 takes up a middle position represented in FIG. 3.

The wind flowing out of the windmill in the direction of the arrow c between the sails 6 and 9 causes a whirl outside the windmill in the area of the nose 13, by means of which a force is exerted on the sail 9 in the direction of the arrow e, and in turn in the direction of rotation d.

When wind blows in the direction of the arrow f as in the case of the embodiment shown in FIG. 4 and FIG. 5, a further force occurs in addition to the forces in the direction of rotation of the windmill described above in the direction of the arrow g, which is caused by wind catching in the triangular-shaped space 25 between the profile strip 23 and the sail 24 and exerts a pressure in the direction of the arrow g.

I claim:

1. A drum-shaped windmill which can rotate at a circumferential speed greater than the velocity of incoming wind, said windmill comprising:

a central tube having opposite first and second ends, said central tube defining primary rotation axis, first and second disc-shaped end plates attached to the respective first and second ends of said central tube so as to be perpendicular to said primary rotation axis, each of said first and second end plates having an outer rim, and at least four sails, each sail comprising an elongated air foil element which, in cross section, has a curved configuration and a thickness which decreases from a head end to a tail end, said sails extending between said first and second end plates near said outer rims thereof and in parallel with said primary rotation axis, each of said air foil elements being pivotally mounted relative to said first and second end plates so as to rotate around a respective secondary axis which extends near said head end thereof and, when oriented in a first position in general conformity with the rims of said first and second plates, exposes a convex outer surface, said air foil elements being dimensioned so that, when rotated by incoming wind towards said central tube, the tail ends thereof will contact said central tube and said air foils elements will be in a second position wherein the chord lengths of said air foils are approximately tangential to the central tube, incoming wind first causing said windmill to first rotate up to a circumferential speed equal to the velocity of the incoming wind and then at a greater circumferential speed due to (a) incoming wind causing sequential air flow elements on a first side of the windmill to rotate into their second positions and the wind pressure against outer convex surfaces thereof causing the windmill to rotate in a first direction up to a speed equal to the velocity of the wind, incoming wind freely flowing through a second side of the windmill and sequential air flow elements on the second side of said windmill to be in their first position, and then (b) incoming wind flowing along the convex outer surfaces of sequential air flow elements on the second side of the windmill which are in their first positions to cause, due to forces exerted on the air flow elements, said windmill to rotate in said first direction at a circumferential speed greater than the velocity of the wind.

2. A windmill according to claim 1, wherein said central tube and said air foil elements are dimensioned such that, when the air foil elements are oriented in general conformity with said rims of said first and second end plates, a distance between a head end of one foil element and a tail end of an adjacent air foil element will be generally equal to a distance between the head end of each foil element and said central tube.

3. A windmill according to claim 1, including a base, said central tube being mounted on said base so as to be rotatable about said primary rotation axis.

4. A windmill according to claim 1, wherein each sail includes a fixedly mounted profile strip which extends between said first and second end plates and which cooperates with an associated air foil element to define a generally V-shaped recess when said associated air foil element is rotated towards the central tube.

5. A windmill according to claim 4, wherein said profile strips have smooth surfaces.

* * * * *